US011161465B2

(12) United States Patent
Soloukmofrad et al.

(10) Patent No.: US 11,161,465 B2
(45) Date of Patent: Nov. 2, 2021

(54) METHOD AND APPARATUS FOR IMPROVED VEHICLE CONTROL ACCOMMODATING FUEL ECONOMY (71) Applicant: FORD GLOBAL TECHNOLOGIES, LLC, Dearborn, MI (US)

(72) Inventors: Ali Soloukmofrad, Dearborn, MI (US); Daniel Lewis Boston, Dearborn, MI (US); Ameen Al-khafaji, Ypsilanti, MI (US); Mohsen Lakehal-Ayat, Mountain View, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 327 days.

(21) Appl. No.: 16/160,487

(22) Filed: Oct. 15, 2018

(65) Prior Publication Data
US 2020/0114844 A1 Apr. 16, 2020

(51) Int. Cl.
*B60R 16/023* (2006.01)
*B60W 20/12* (2016.01)
*G07C 5/08* (2006.01)
*B60W 50/14* (2020.01)

(52) U.S. Cl.
CPC ......... *B60R 16/0236* (2013.01); *B60W 20/12* (2016.01); *B60W 50/14* (2013.01); *G07C 5/085* (2013.01); *B60W 2050/146* (2013.01); *B60W 2530/14* (2013.01); *B60W 2552/00* (2020.02)

(58) Field of Classification Search
None
See application file for complete search history.

(56) References Cited

U.S. PATENT DOCUMENTS

| | | | |
|---|---|---|---|
| 10,042,359 B1* | 8/2018 | Konrardy | B60L 58/12 |
| 10,324,463 B1* | 6/2019 | Konrardy | G01S 19/14 |
| 10,395,332 B1* | 8/2019 | Konrardy | G06Q 50/265 |
| 2007/0112475 A1* | 5/2007 | Koebler | B60L 3/12 701/1 |
| 2011/0246004 A1* | 10/2011 | Mineta | G01C 21/3469 701/22 |
| 2014/0244130 A1* | 8/2014 | Filev | B60K 31/00 701/96 |
| 2014/0277835 A1* | 9/2014 | Filev | G01C 21/3469 701/2 |
| 2016/0332585 A1 | 11/2016 | Baverstock | |
| 2017/0219364 A1* | 8/2017 | Lathrop | G01C 21/3453 |
| 2017/0343369 A1 | 11/2017 | Anastassov et al. | |
| 2018/0004211 A1* | 1/2018 | Grimm | G01C 21/3407 |
| 2018/0118030 A1* | 5/2018 | Koebler | B60L 15/2045 |
| 2018/0170349 A1* | 6/2018 | Jobson | B60W 50/0097 |
| 2018/0174485 A1* | 6/2018 | Stankoulov | G09B 19/167 |
| 2018/0211546 A1* | 7/2018 | Smartt | G05D 1/0088 |
| 2019/0235497 A1* | 8/2019 | Glebov | G01C 21/3667 |

* cited by examiner

*Primary Examiner* — Dale W Hilgendorf
*Assistant Examiner* — Alexander C. Bost
(74) *Attorney, Agent, or Firm* — Michael Spenner; Brooks Kushman P.C.

(57) ABSTRACT

A system includes a processor configured to determine that travel data, reflecting previous travel, exists for an upcoming route segment. The processor is also configured to derive a fuel-efficient control strategy for the upcoming segment, based on fuel efficient behavior reflected in the travel data. The processor is further configured to execute the control strategy in a vehicle while the vehicle travels over the route segment to instruct vehicle control in accordance with the control strategy for at least a portion of the segment.

6 Claims, 6 Drawing Sheets

METHOD AND APPARATUS FOR IMPROVED VEHICLE CONTROL ACCOMMODATING FUEL ECONOMY

TECHNICAL FIELD

The illustrative embodiments generally relate to methods and apparatuses for improved vehicle control accommodating fuel economy.

BACKGROUND

As fuel prices remain high, drivers are always looking for ways to save fuel. While vehicles have estimated miles per gallon (MPG), those numbers often accommodate a very specific set of driving parameters. Between varied routes, speeds, acceleration, traffic and weather conditions, drivers may struggle to maximize fuel economy. The same is true for vehicle charges, which may last significantly longer, but which may also be more inconvenient for drivers to recharge, given the time involved in charging and availability of charging stations. Since vehicles can often be charged at home, drivers may want to optimize charge consumption so that they are ensured of the opportunity to recharge at home.

Vehicles are capable of displaying instantaneous fuel consumption, which may assist drivers. This number can vary wildly, however, as the driver accelerates and/or cruises (traveling without acceleration). As such, it can be difficult to gauge an accurate measure of consumption, even if one is frequently checking these numbers.

SUMMARY

In a first illustrative embodiment, a system includes a processor configured to determine that travel data, reflecting previous travel, exists for an upcoming route segment. The processor is also configured to derive a fuel-efficient control strategy for the upcoming segment, based on fuel efficient behavior reflected in the travel data. The processor is further configured to execute the control strategy in a vehicle while the vehicle travels over the route segment to instruct vehicle control in accordance with the control strategy for at least a portion of the segment.

In a second illustrative embodiment, a computer-implemented method includes breaking the route into one or more predefined segments, according to a predefined segmentation strategy, responsive to receiving route data. The method also includes determining optimal vehicle behavior for a given segment, derived from a set of data reflecting previous vehicle travel over the given segment. The method further includes, for each segment for which optimal behavior was determined, generating a control strategy to instruct vehicle control according to the optimal vehicle behavior.

In a third illustrative embodiment, a system includes a processor configured to access a record of travel data representing driver-travel, for an identified driver, over an identified route segment. The processor is also configured to determine instances of previous travel along the segment, from the record, representing optimal fuel usage, based on fuel usage reflected in the record. The processor is further configured to create a travel-strategy instructing vehicle control to optimize fuel usage, based on the determined instances.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
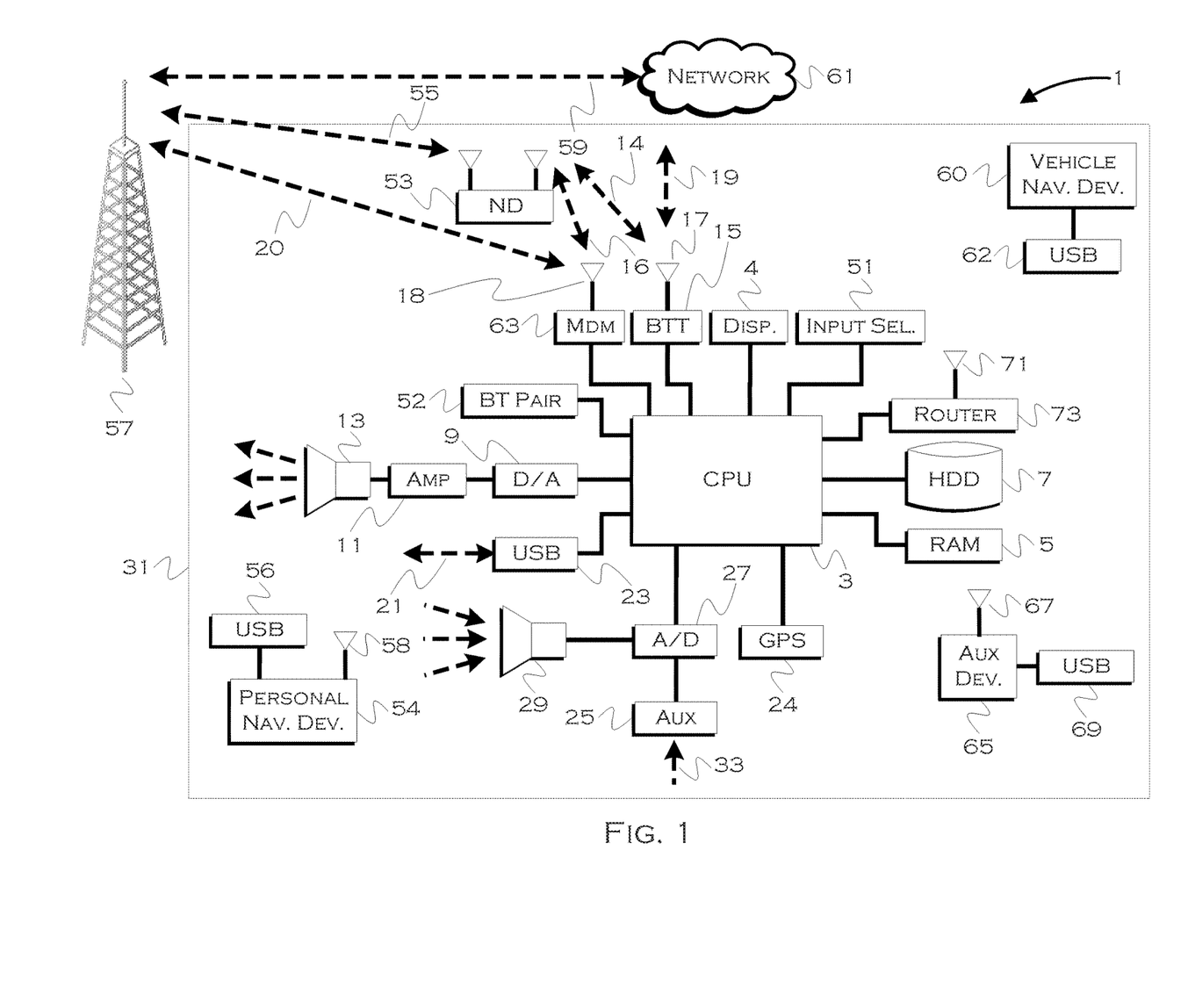
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments provide for improved fuel/charge consumption (fuel as used herein refers to both liquid fuel and charge), which can determine optimal or near-optimal traveling conditions accommodating traffic, weather and projected stops. For example, it is inadvisable, from a consumption perspective, to accelerate rapidly before an upcoming stop. Even drivers who are familiar with a route, however, may fail to take advantage of all the opportunities to cruise/coast to a stop, consuming little fuel in the process.

By considering optimal fuel economies achieved by a driver over known routes or route segments, over time, a vehicle can begin to accurately project a reasonable expected consumption over a route segment. Because the consumption often ties to certain driver behaviors, the vehicle can also determine (based on saved data) the observed behaviors for a driver that lead to the optimal conditions. From a personal perspective, this can be useful because an aggressive driver (who may use more fuel), may prefer to consume a little extra fuel, while maintaining an aggressive driving style. At the same time, even that driver may find little reason to accelerate into a stop, so the projection could model past-observed optimal "aggressive" behavior, which optimizes consumption given the driving preferences of the driver.

For drivers more concerned with pure optimization, the system can model both the driver's own behavior and behavior of vehicles with similar consumption profiles. This can include, for example, vehicles of the same make, model, year and/or class (e.g., compact, SUV, sedan, truck, etc.). By observing the behavior of optimal drivers over a segment, the system can predict what sorts of behavior, for a given vehicle or vehicle-type, lead to the best fuel consumption over the given segment. These models can accommodate observed traffic and weather conditions, as well as temporary conditions such as construction.

Regardless of whether a user wants a user-centric (based on user data) or group-centric (based on crowd data) recommendation or control strategy, the illustrative embodiments can provide improved fuel economy in the form of both recommendations and/or vehicle control.

Many vehicles come equipped with active cruise control (ACC) or other quasi-autonomous functions. Currently, ACC typically functions to maintain a set speed while accommodating a certain stopping distance from leading vehicles. By using this and similar systems, the vehicle can be autonomously or semi-autonomously controlled to better use fuel, by reference to the data for a given route segment.

For example, a typical ACC system may maintain a speed of 50 miles per hour, uphill, to a stopping point at the top of the hill, only slowing if a leading vehicle slows, despite the fact that a stop sign or light exists at the top of the hill. This could require significant acceleration, only to eventually stop (or possibly stop, in the case of the light). If the system had previously observed that the vehicle could slow an acceleration profile ⅔ of the way up the hill, and effectively use momentum to coast to a smooth stop with reduced fuel consumption, then in the illustrative embodiments the ACC could limit acceleration in accordance with the "better" observed behavior, even if a leading vehicle was still traveling at 50 miles per hour. Thus, while the gap between vehicles may widen, the vehicle with the improved system provided by the illustrative embodiments would coast to a necessary stop, minimizing fuel consumption. Otherwise, with typical ACC systems, for example, the vehicle would continue to consume fuel until the leading vehicle slowed down.

This and similar behavior by the ACC, which would now, under the illustrative embodiments, accommodate fuel consumption strategies, can be used to improve fuel usage without the user having to directly respond to needs for changing driving strategies. If the previous behavior was based on user-centric data, the ride produced by the ACC would feel similar to a user's preferred driving strategy. If the data was based on a group-centric model, the ride may fell slightly different, but the user would know that fuel was being used in a projectedly optimized manner given current conditions.

In vehicles that lack ACC, or if a driver prefers to react personally, the same data that would be provided to the ACC (e.g., slow to 40 mph, cease acceleration, etc.) can be provided as visual or verbal output. Thus, even drivers with no vehicle human machine interface (HMI) and no ACC can benefit from the improved modeling.

Because optimized behavior varies based on stop signs, street lights, road conditions, road grades and a variety of other factors not commonly included on maps, the illustrative embodiments can model behavior over discrete sections of road, and use that same behavior for recommendations and/or ACC control. If there is no data for a given segment, the process can search a database for roads having projectedly similar characteristics and use that data as a close approximation. By tying in road-centric considerations as well as weather and traffic data (and the affect this has had on past observed economy), the system is capable of providing highly-customized and route-centric recommendations designed specifically for a given route or route-segment. This can significantly improve both economy and projections over typical models, and can further provide a system capable of at least quasi-autonomous control with an economy-focus, which is a marked improvement over existing systems. The novel, uncommon and atypical examples and concepts described herein demonstrate potential improvements achievable through use of those examples, concepts, and the like.

Figure 2:
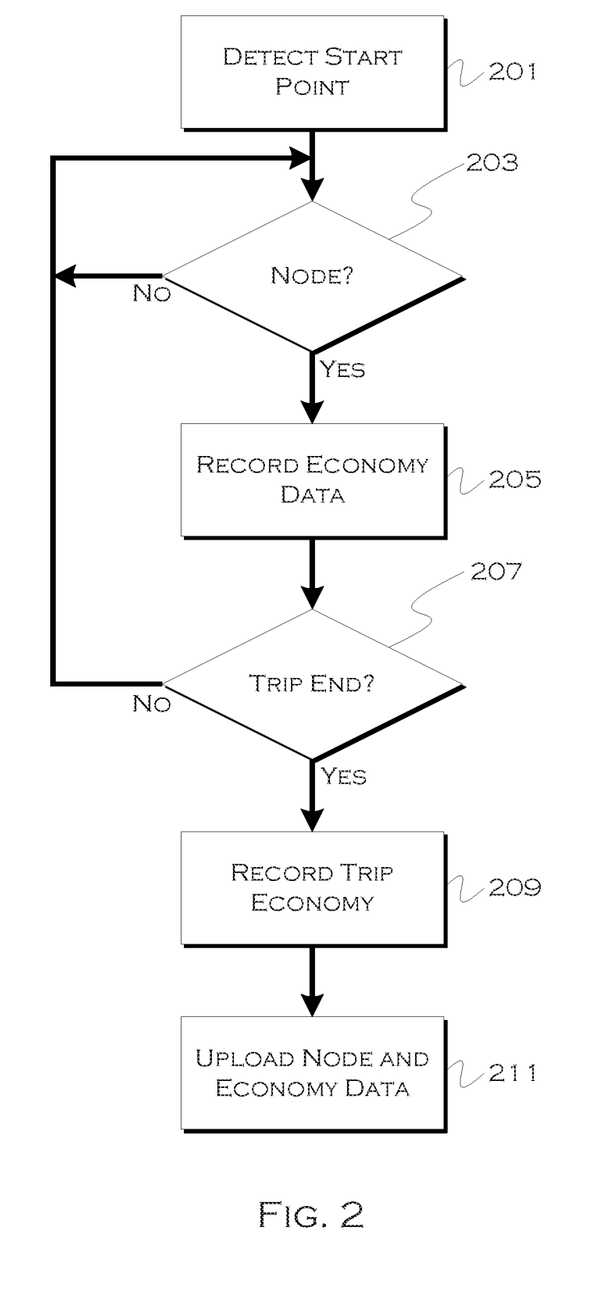
FIG. 2 shows an illustrative process for economy tracking.

FIG. 2 shows an illustrative process for economy tracking. In this example, the process executes in conjunction with a vehicle, to gather data for a route or route segment. While in one example the process may gather data for an entire route, it may also be useful to consider the route a series of route segments. This can be defined by, for example, nodes, which may represent intersections or turning points. Thus, for example, if a user commonly travels the same four mile stretch of road for many destinations, meaningful data about the four mile stretch can be gathered much more quickly than if each trip was considered as an entire route.

Here, the process detects 201 a start point or start location (e.g., home as defined by proximity to known coordinates, even if the actually GPS coordinates may vary slightly, or a geofence). As the vehicle travels, the process can accumulate acceleration and deceleration data, stop data, slowing data, traffic data, weather data, etc. Any data that may be useful in later recommendations or control strategies may be gathered.

Until the vehicle reaches 203 a node, in this example (which gathers by route and by node), the process can continue gathering for a segment. If the vehicle reaches a node (intersection, intersection of a certain size or type, turn point, etc.), the process can record 205 the gathered economy data for the segment leading up to the node. In the first segment, this will be a segment from the start point to a node, in later segments this will be data from one node to the next. This process of gathering and recording can continue until the trips ends 207. Once the data has been gathered and recorded 209 for the trip (or as the vehicle travels), the process can upload 211 the vehicle data to a database.

Figure 3:
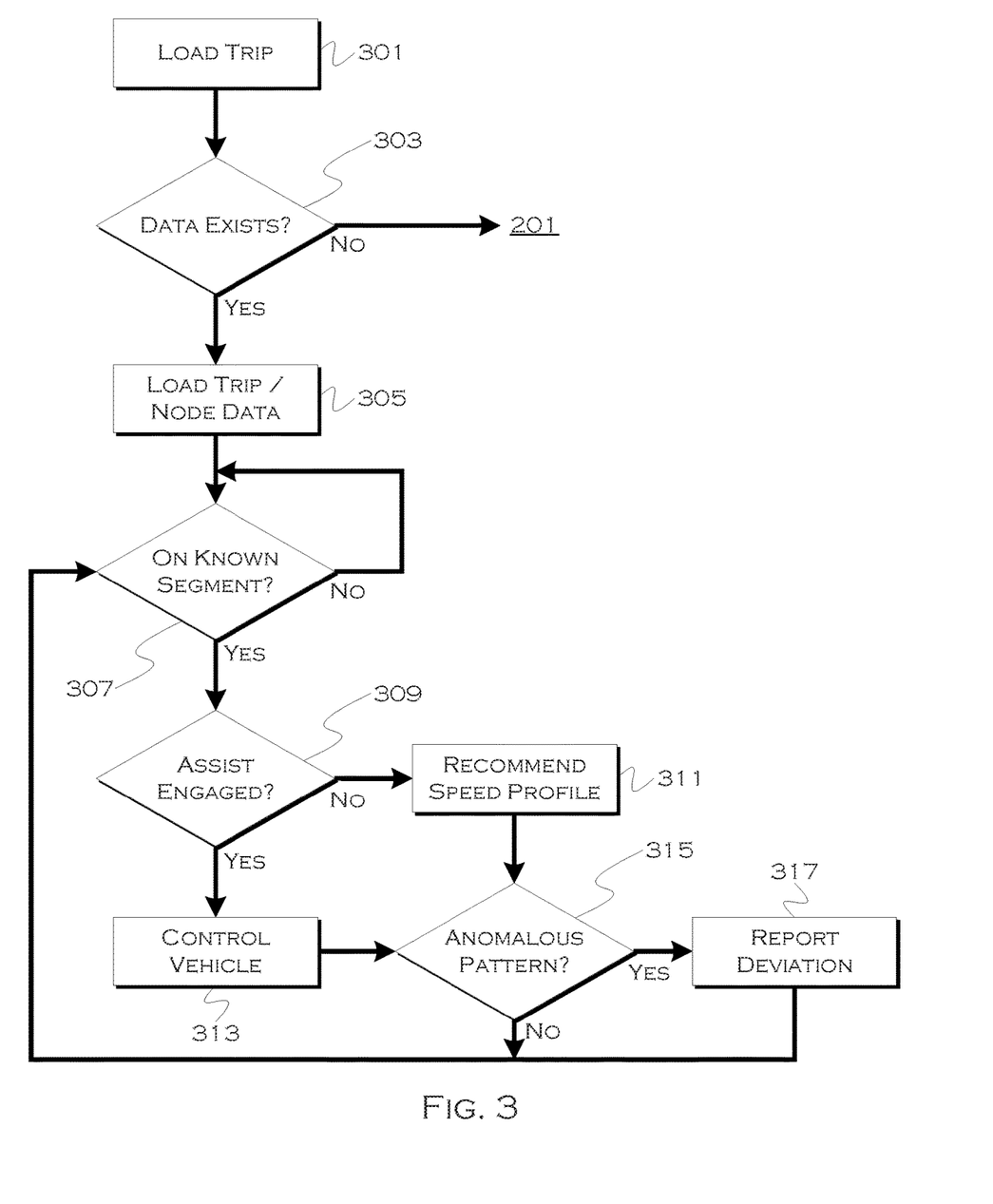
FIG. 3 shows an illustrative process for improving fuel economy.

FIG. 3 shows an illustrative process for improving fuel economy. In this example, the process will attempt to provide guidance and/or control strategies for a route. The process loads 301 a planned or projected route (projected routes can be used if no route is input, based on a predicted destination). If data exists for the route, or segments of the route 303, the process can continue, if no data exists or is obtainable for the route or segment, the process can simply act in a data-gathering process as in FIG. 2.

As will be seen, it is possible to derive data from others who have traveled the route or segment and/or from travel over similar segments. Whether data "exists" or not can depend on user preferences for which data is used, as well as actual data in the database. For example, if a user only wants their own data for already-traveled routes, the user may not receive data for a segment, even if there is crowd data for the segment, user data for a similar segment and/or crowd data for a similar segment.

If data exists for some or all of the route, the process can load 305 the data relevant to the route or particular segments. This data can reflect an expected control strategy or recommendations, and may be updated based on changing dynamic conditions (e.g., weather, traffic, time of day, etc.). If the vehicle is entering or on a segment for which data is known 307, the process determines 309 if driving assistance or autonomous control is engaged. If there is no autonomous control or assistance, the process may simply provide 311 strategies in the form of visual or verbal (or haptic) output. Haptic feedback could include decreasing or increasing resistance on an accelerator or braking, provided that this was deemed to be a viable and safe solution.

If driver assistance is engaged, the process may control 313 the vehicle to a limited or full extent, under the guidance of a control strategy for the known segment. This can include, for example, accelerating or braking to optimize fuel consumption, regardless of surrounding traffic behavior, except to accommodate traffic behavior to keep the occupants safe. If the process detects an anomalous pattern 315, the process may vary a strategy or disengage. An anomalous pattern could be braking when not expected, for example, or the user having to repeatedly take control of the vehicle to accommodate conditions. The process can report 317 the pattern (in case it repeats for that segment, representing a new permanent or persistent condition) and then can treat the segment as an "unknown" segment, for which insufficient data exists, until reaching a new segment or when the user patterns may tend to indicate that expected travel conditions have resumed (allowing the process to resume control). The process may also report experienced economy data for any segment, in order to determine how closely the goal economy was to being met.

Figure 4:
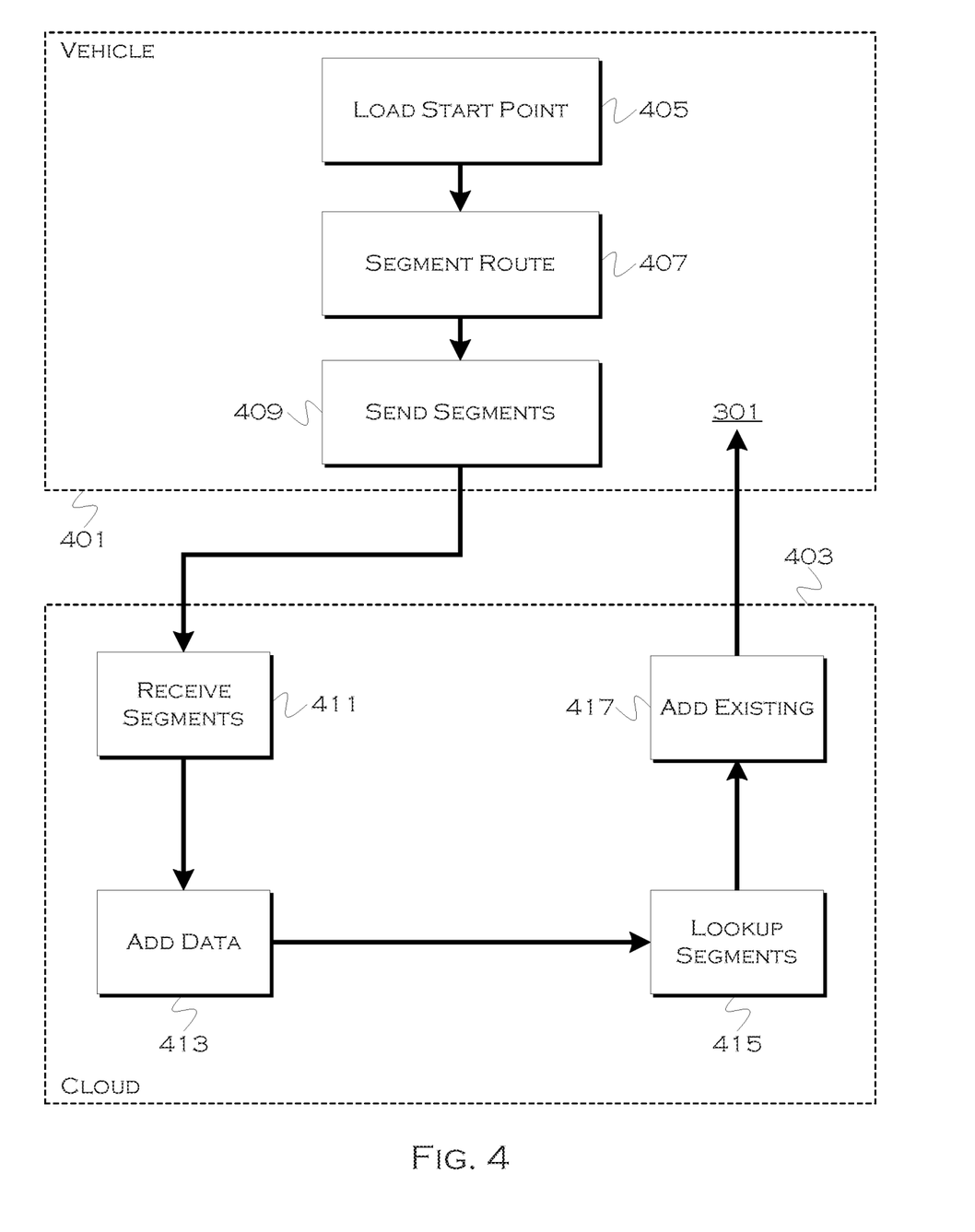
FIG. 4 shows an illustrative process for trip-segment data processing.

FIG. 4 shows an illustrative process for trip-segment data processing. In this example, a vehicle 401 may load 405 a start point based on where the vehicle is presently located when a route is requested or when the vehicle is powered. If a projected or input route exists, the process may segment 407 the route according to a known strategy. This can be the same strategy as that used for determining nodes, for example, such that the route is segmented based on how the vehicle would have tracked node data so that a comparison of segments can be achieved in an expected manner. The process then sends 409 the segments to a server 403 for processing.

While all of what follows could be done on the vehicle or on a mobile device, in this example the process on the server receives 411 the segments and adds 413 travel-affecting data, such as, for example, weather, traffic, construction, etc. The process can then look up 415 segments based on the amended data, so the result not only reflects travel previously observed over a given segment, but over the given segment under the amended conditions. Events, such as parades, sporting events, concerts, etc., may also be factors that are considered, since traffic patterns tend to change around those events. With sufficient data, the effect on traffic could even be projected based on ticket sales or expected attendance.

For each identified (or projectable) segment, the process 417 can add a control strategy or guidance and return the segment(s) to the vehicle to enact a control strategy or for driver-guidance. This process can be ongoing as a vehicle travels, which may be useful if the amended condition data is likely to change (e.g., traffic may clear, or weather may change).

Figure 5:
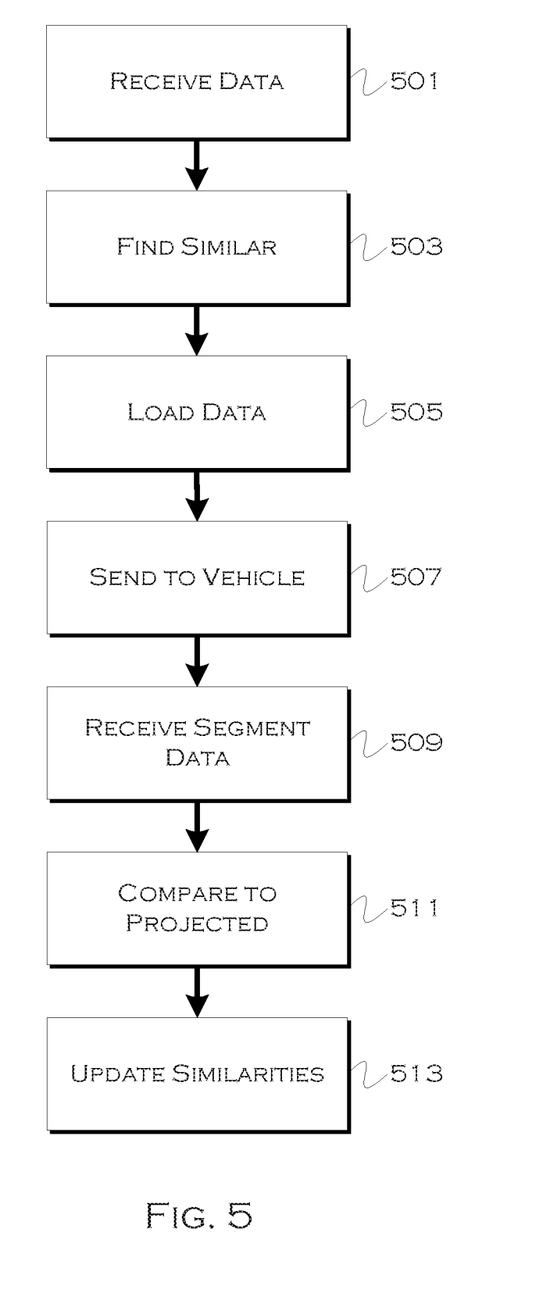
FIG. 5 shows an illustrative process for group-centric fuel economy processing.

FIG. 5 shows an illustrative process for group-centric fuel economy processing. In this example, the process predicts a control strategy or guidance data based on, for example, a similar vehicle which has traveled a current route, or the current or a similar vehicle which has traveled a similar route/segment. For example, if the driver has only driven a road once, the data for that driver may be incomplete. If the same driver has driven a parallel stretch of road, one mile away, very frequently, and if that road has similar grade and stopping characteristics, the driver's data from that road may be useful in projecting guidance for the current segment.

At the same time, significant crowd data may be available for both the current and similar stretch of road. If the driver is amenable, the crowd data for similar vehicles over the current stretch of road can be used to model guidance. If the driver prefers personal data as the basis for guidance, the fact that vehicles traveling over the similar stretch of road have exhibited similar characteristics as those same vehicles traveling over the current stretch of road (i.e., situations where one driver has driven both roads frequently) can be used to determine that the similar stretch of road is, in fact, similar. This may be a sufficient indicator that the driver's own data from the similar stretch of road will likely be useful for modeling the current stretch of road, at least until the driver has driven the current stretch enough times to develop enough personal data for guidance.

Once the vehicle has found 503 a suitable similarity (whether this is personal or crowd data may depend on design or driver preference), the process loads 505 the usable similar data for a control strategy. The process sends

507 this data to the vehicle, and the vehicle records data as it travels the segment using the control strategy.

The process then receives 509 the segment data back from the vehicle, and compares 511 the received data to expected efficiency data (projectable based on the implemented or recommended strategy). This comparison can be used to determine how effective the similar data was (i.e., does that data work for this road) and to update 513 a model for similarities. Such feedback can be useful to the individual driver, who may need future similarity data, as well as the database in general, for determining if the comparison to a similar road, for example, was a useful comparison and should be used in the future for this or other drivers.

Figure 6:
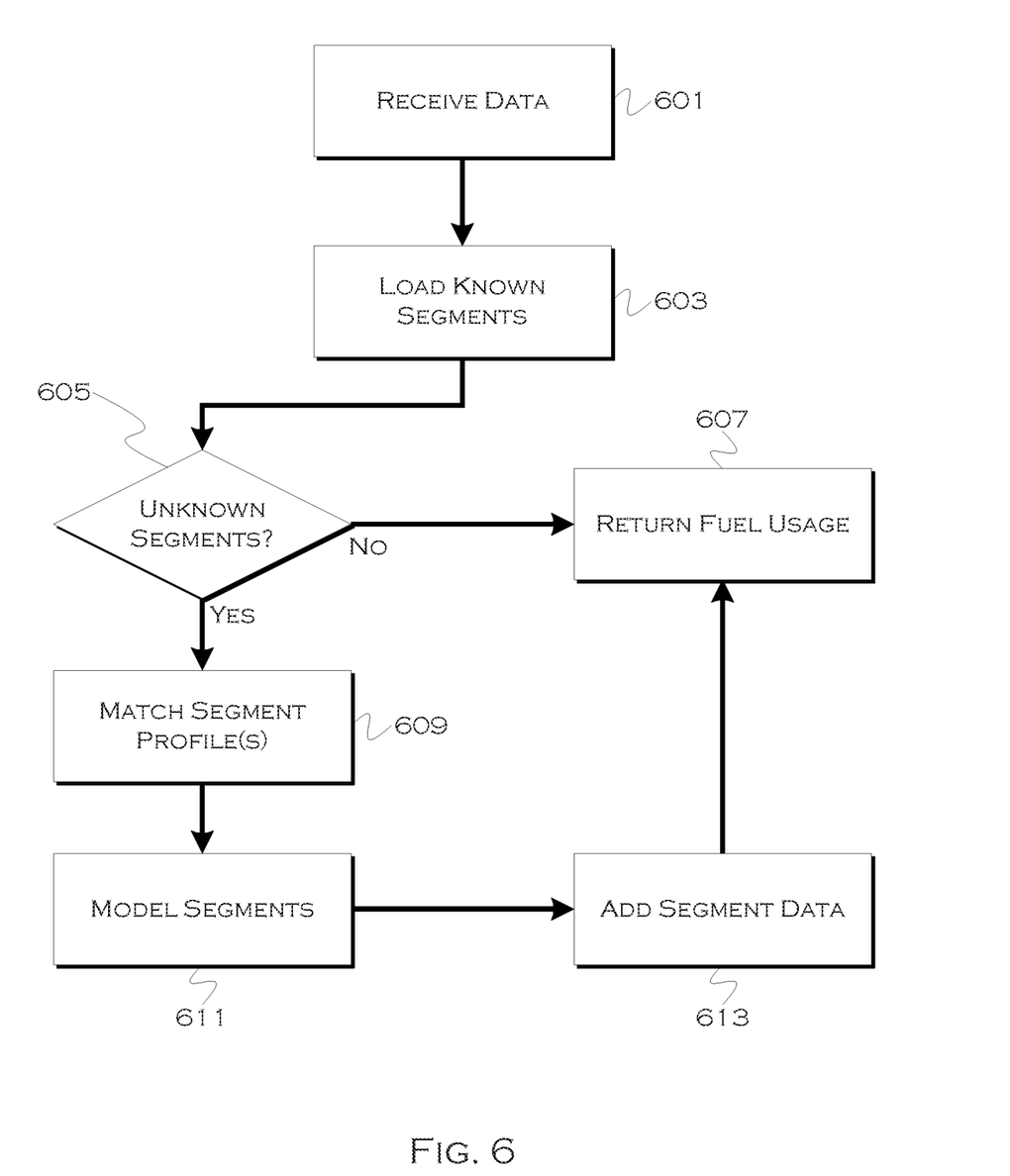
FIG. 6 shows an illustrative process for distance to empty calculation based on modeling.

FIG. 6 shows an illustrative process for distance to empty calculation based on modeling. This process leverages the guidance data to provide a more accurate estimation of fuel usage for a driver. Either by knowing what economy can be achieved by the guidance, for a route or series of routes, and/or by knowing the expected driver usage when not guided (based on accrued data), the process can project a distance to empty along a current and/or projected route(s). This example relates to a current route, but knowing the user's habits can actually allow the system to string together a series of both usage projections and economy projections, to achieve an overall distance to empty.

Since the system can project optimized or semi-optimized economy data based on guidance, when available, the system could provide an estimated maximum distance to empty, as well as an "unguided" distance to empty. That is, when the driver drives the road(s) in question without guidance, the driver may historically experience efficiency of 20 mpg, and when the driver uses guidance, the driver may historically and projected expect efficiency of 23 mpg, and so if there were 10 gallons of fuel remaining, the projected range could be 230 guided miles to 200 unguided miles for a given driver's personal driving habits. If the driver has 210 miles to go, and wants to reach a destination without refueling, the driver may thus be incentivized to follow the guidance or allow automatic control for at least a portion of a journey.

In this example, the process receives 601 route data, but this data could also include projected usage data, if a current route was not going to empty a tank under certain or any projections. That is, instead of projecting 50 miles remaining based on a 20 mile commute to work, when the route is only 20 miles, the process could project that the next destination would be back to home, and that the trip would be taken during heavy traffic with a worse efficiency, and thus the miles remaining may only be 40 (given the expected conditions on the way home). At the same time, the process may indicate that the driver, using guidance, can achieve 45 miles on the current fuel/charge, and thus the user may elect to use or listen-to the guidance for some or all of the travel, in order to make it back home on the current fuel/charge.

The process uses the data to load 603 guidance and/or historical projection data (user-guided travel) for the known segments of a route, where travel data is known or projectable based on similarities as suitable for a given user and previously discussed herein. If there are no unknown segments (i.e., if the process has suitable data for a remaining amount of fuel to cover known segments), the process may simply report 607 the projected distance(s) to empty. Again, this can be a single number or a range based on user guided vs. strategy guided travel.

If there are unknown segments, in this example, the process attempts to match 609 those segments to the nearest possible known profile (crowd or user, as appropriate) over which travel has been recorded based on data suitable for a given user. This allows the process to model 611 travel over those segments and add 613 projected efficiency data for those segments. Since there may not be sufficient similarity to any commonly traveled roads, the process may also decrease the fuel efficiency by a predefined amount, in order to avoid over-projecting distance to empty in light of the travel on the modeled, but otherwise unknown, segments. That is, the process may determine that the user achieves 22 miles per gallon on local highway travel, but may not have data indicative of the achievable efficiency for that user on new highway travel (untraveled by that user). In light of this, the process may only project, for example, 20 miles per gallon on the previously-untraveled segment, even if the likely efficiency is 22 miles per gallon.

By adapting to user data and by using that data to guide future travel, the illustrative embodiments can improve fuel efficiency based on observed facts that improved efficiency is achievable for a given route or segment. This can accommodate changing conditions, and drivers can use their own data or similar data based on personal preference. All of this capability marks an improvement over existing systems presently in use. The process can also provide a driver with a new fuel efficiency or new projected distance to empty, based on a new control strategy, reflecting the improved fuel usage projected to be achieved if the strategy is implemented.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
      access a record of data representing travel, for an identified driver, over an identified route segment;
      determine instances of previous travel along the identified route segment, from the record, representing optimal fuel usage, based on fuel usage in the record;
      create a travel strategy instructing vehicle control to optimize fuel usage, based on the determined instances; and
      output a distance to empty calculation projected from the travel strategy.

2. The system of claim 1, wherein the processor is configured to create the travel strategy to include control instructions for a vehicle control system.

3. The system of claim 2, wherein the vehicle control system includes adaptive cruise control.

4. The system of claim 1, wherein the processor is configured to create the travel strategy to include recommendations for output to a driver.

5. The system of claim 1, wherein the processor is configured to deliver the travel strategy to a vehicle that provided driver identification and route segment identification.

6. The system of claim 1, wherein the processor is configured to execute the travel strategy using a vehicle-control system.

* * * * *